Dec. 19, 1950 S. HILLER, JR., ET AL 2,534,353
ROTARY WING AIRCRAFT
Filed Jan. 24, 1949 7 Sheets-Sheet 5
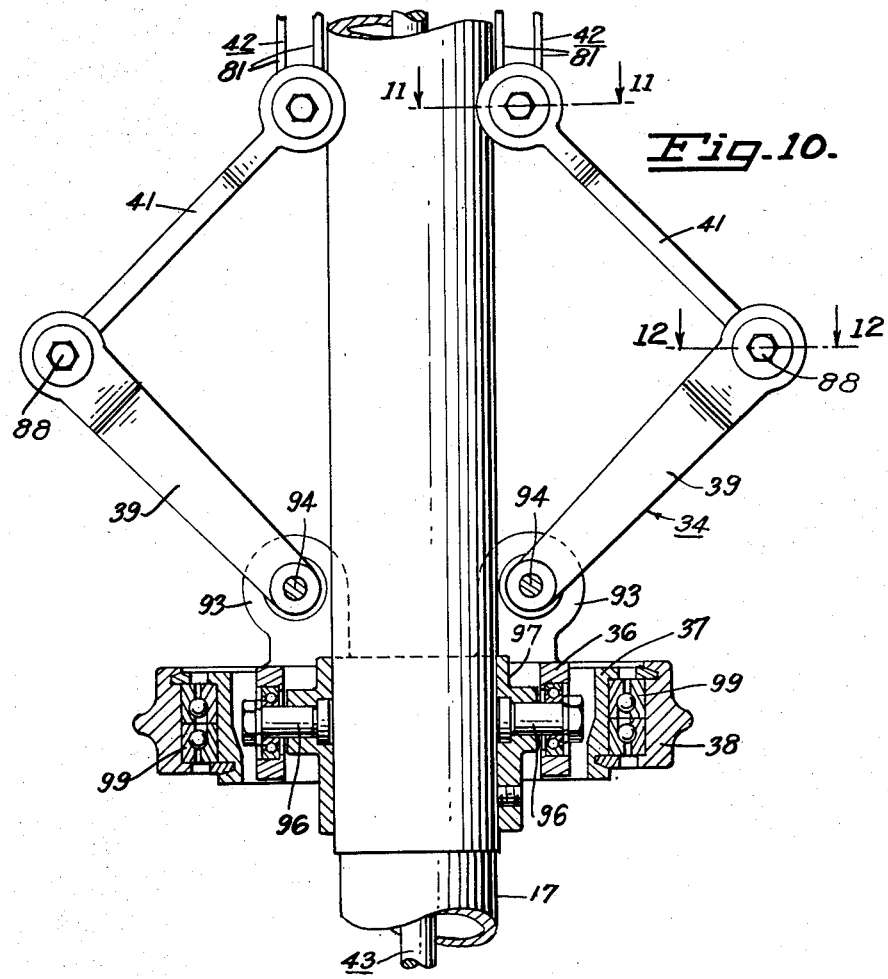
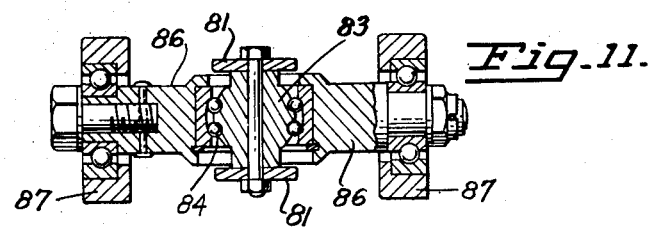
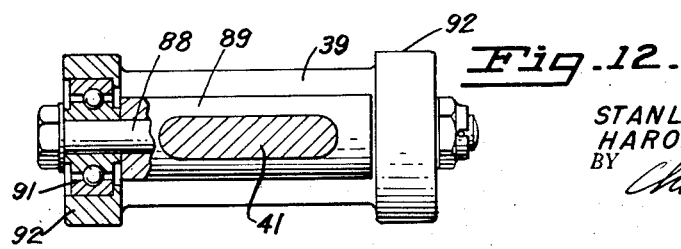
INVENTORS
STANLEY HILLER, JR.
HAROLD H. SIGLER
BY
ATTORNEY

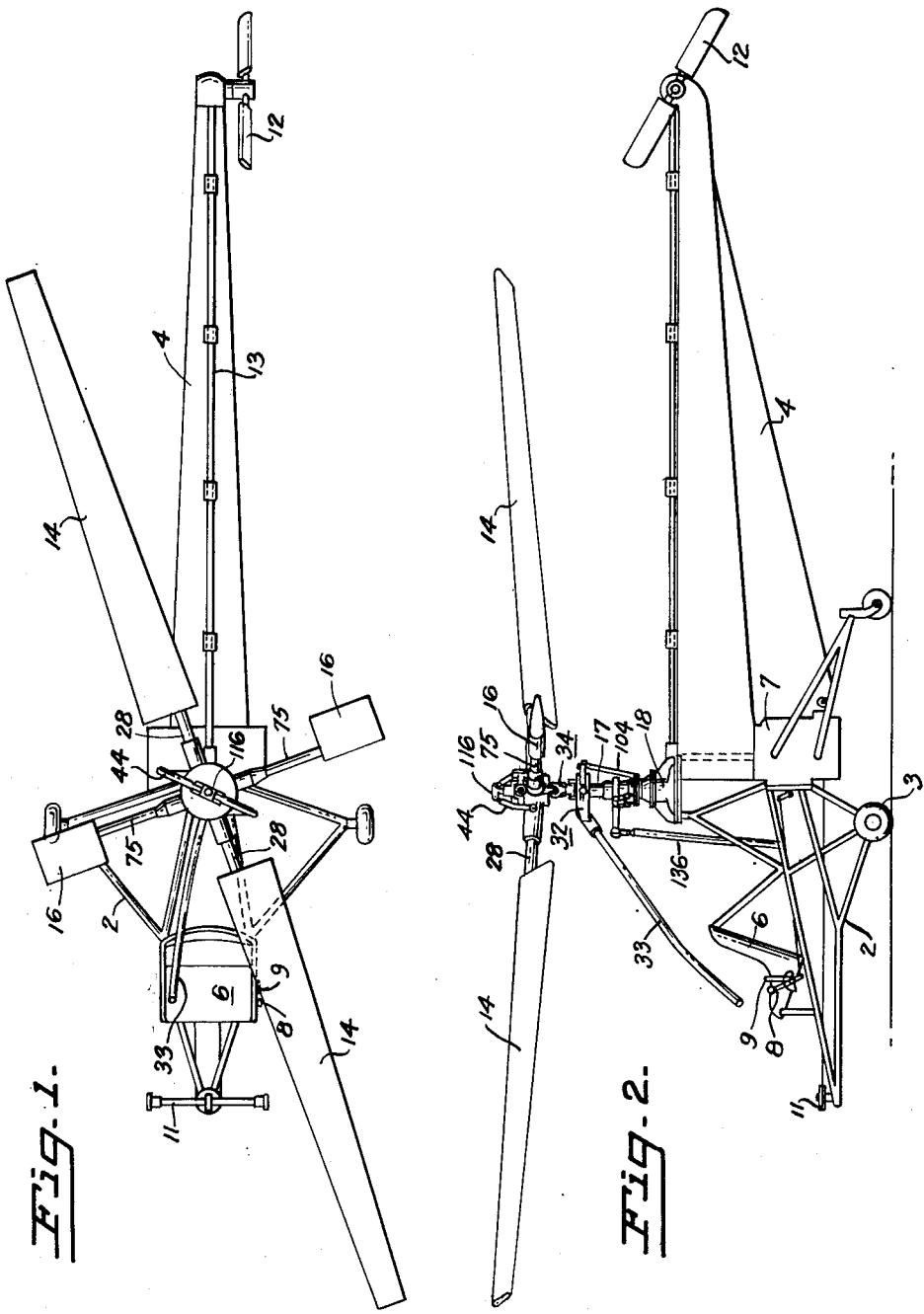

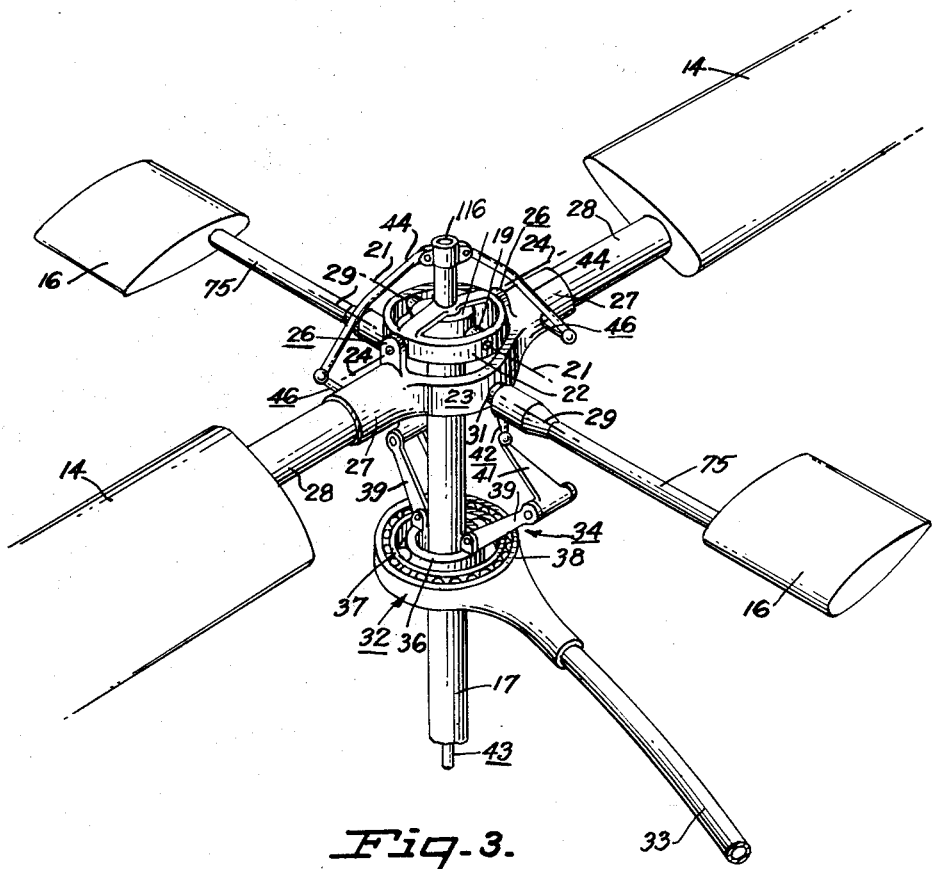

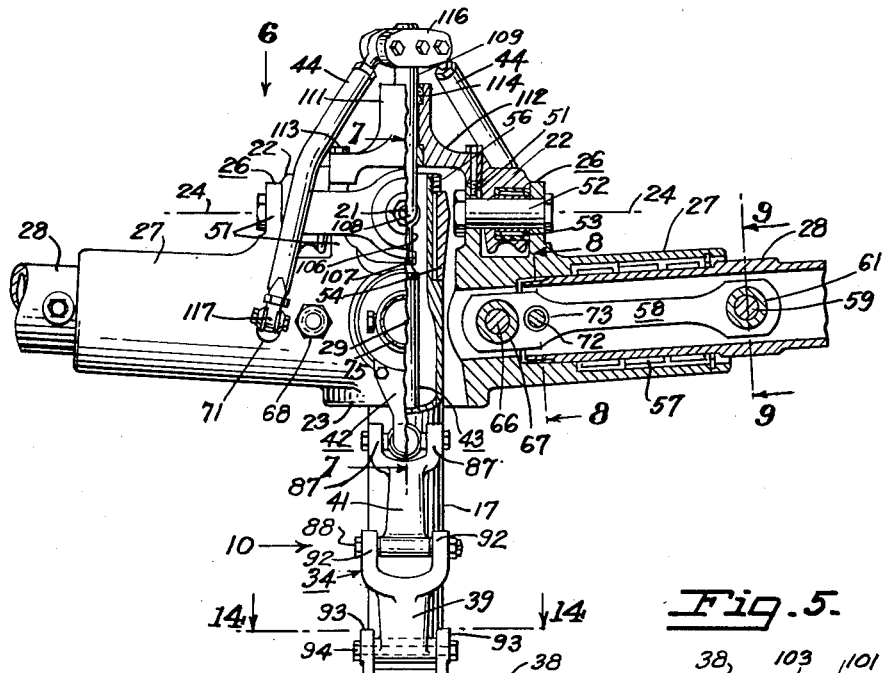
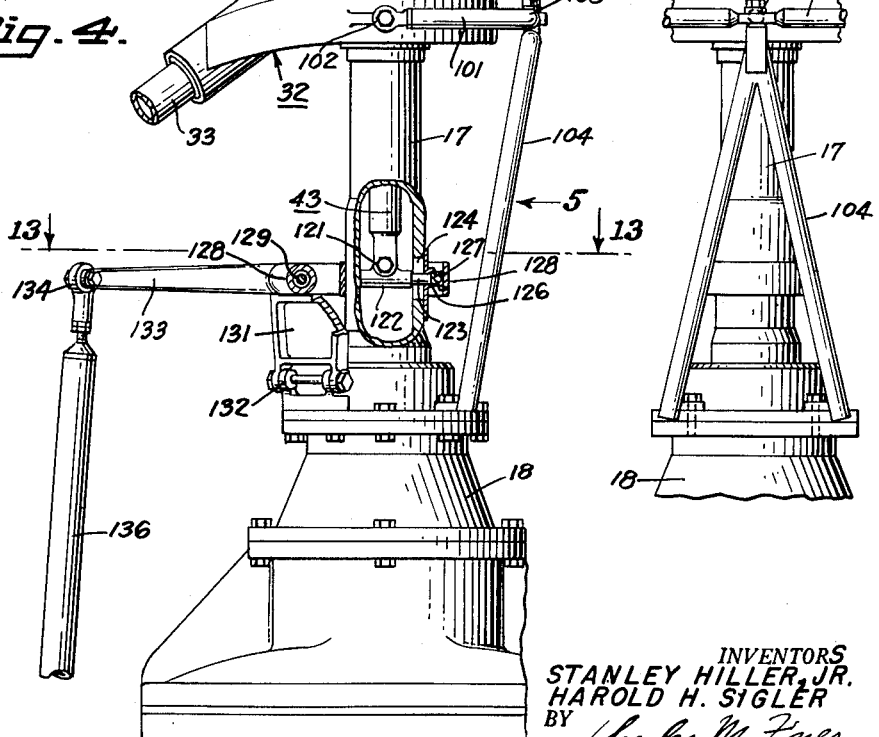

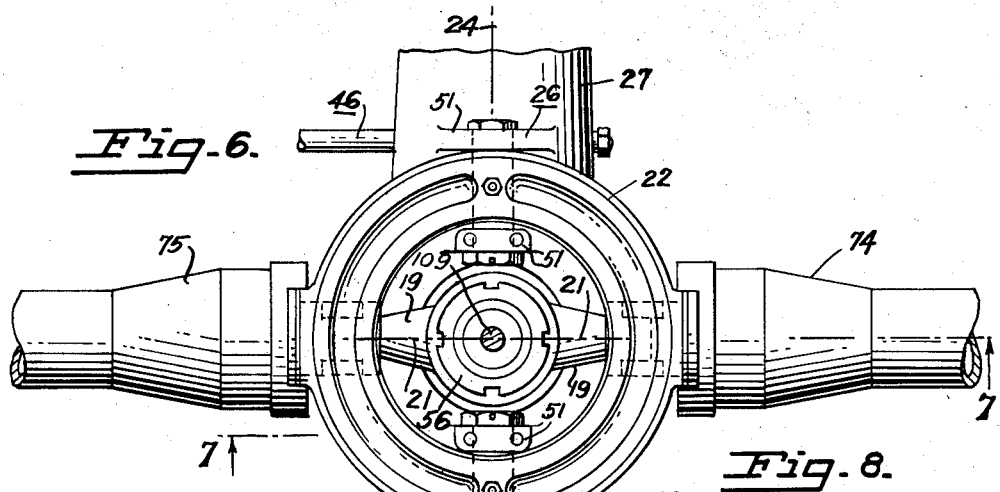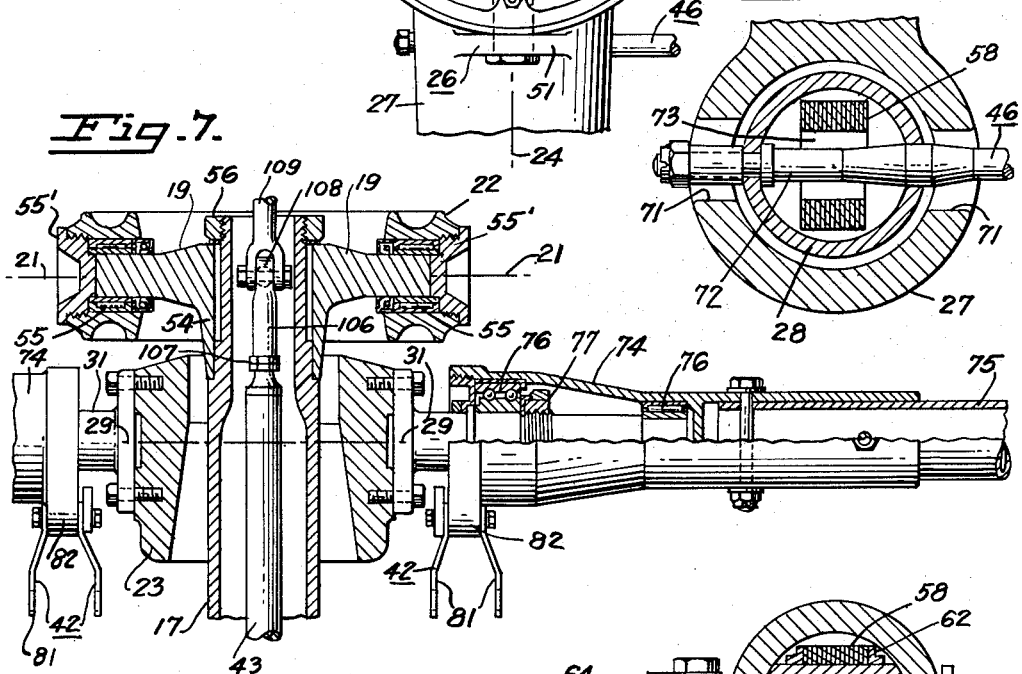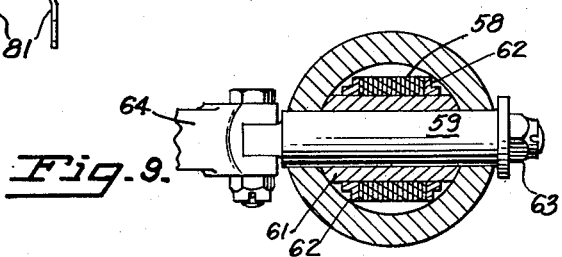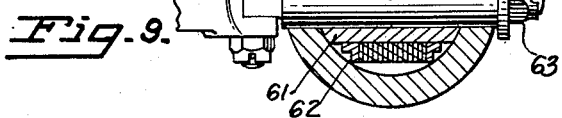

INVENTORS
STANLEY HILLER, JR.
HAROLD H. SIGLER
BY
ATTORNEY

Dec. 19, 1950  S. HILLER, JR., ET AL  2,534,353
ROTARY WING AIRCRAFT

Filed Jan. 24, 1949  7 Sheets-Sheet 7

INVENTORS
STANLEY HILLER JR.
HAROLD H. SIGLER
BY
Charles M. Fryer
ATTORNEY

Patented Dec. 19, 1950

2,534,353

UNITED STATES PATENT OFFICE 2,534,353

ROTARY WING AIRCRAFT

Stanley Hiller, Jr., Menlo Park, and Harold H. Sigler, San Carlos, Calif., assignors to United Helicopters, Inc., Palo Alto, Calif., a corporation of California Application January 24, 1949, Serial No. 72,453

6 Claims. (Cl. 170—160.26)

This invention relates to rotary wing aircraft, such as helicopters and Autogiros, and more particularly to a helicopter rotor control of the type disclosed in assignee's copending application by Stanley Hiller, Jr., and Joseph Stuart, III, Serial No. 752,146, filed June 3, 1947, now U. S. Patent No. 2,481,750, wherein a pilot-controlled servo-control blade is provided to control the cyclic pitch of a lift wing.

As is explained in the specification of such application, the control blades for the lift wings of the rotor are each relatively small and do not have any material lift characteristics insofar as support of the aircraft is concerned, and they do not necessarily contribute to lift of the aircraft. There is an inherent slower rate of response to the adjustment imparted to the control blades by the pilot operable control stick as compared to direct adjustment of the lift wings by such control stick. This slower rate of response coupled with ease of adjustments of the control blades makes for safety in operation compared to heretofore employed arrangements where the main lift wings of the lift rotor are directly pilot controlled.

This is so because in the latter, the response to adjustment is so rapid, relatively speaking, that it is difficult for a pilot, unless extremely experienced, to note the effect of his adjustment in order to avoid over-adjustment. As a result, he has to fight the control stick. With the mechanism of such invention, since it provides a low uniform sensitivity, the pilot has ample time to make proper adjustments without overshooting and with very little effort on his part.

The invention described in the instant application incorporates all the features and advantages of the aforesaid copending application. It has as its object, among others, the provision of a relatively simple improved arrangement of mounting the control blade for each lift wing so as to provide an advantageous "feed-back" effect resulting from flapping or end to end tilting of the lift wing which will be explained more fully hereinafter.

Referring to the drawings:

Fig. 1 is a more or less schematic plan view of a helicopter embodying this invention;

Fig. 2 is a side elevational view of Fig. 1;

Fig. 3 is a schematic isometric view of the main elements embodied in this invention;

Fig. 4 is a side elevational view, partly in section and partly broken away to illustrate more clearly the construction, of a preferred form of mechanism embodied in this invention;

Fig. 5 is a fragmentary elevational view looking in the direction of arrow 5 in Fig. 4, and illustrating means for holding against rotation the outer ring of wobble mechanism embodied in the structure;

Fig. 6 is a fragmentary plan view looking in the direction of arrow 6 in Fig. 4, and illustrating the structure for universally mounting the control blades and the lift wings on the rotor column; parts being omitted from the view to illustrate more clearly the construction;

Fig. 7 is a fragmentary sectional view taken in planes indicated by line 7—7 in Fig. 6, and also in a plane indicated by line 7—7 in Fig. 4.

Fig. 8 is a section taken in a plane indicated by line 8—8 in Fig. 4;

Fig. 9 is a section taken in a plane indicated by line 9—9 in Fig. 4;

Fig. 10 is a fragmentary vertical sectional elevation, partially broken away, of the wobble mechanism and linkage to the control blades, looking in the direction of arrow 10 in Fig. 4;

Fig. 11 is a section taken in the plane indicated by line 11—11 in Fig. 10;

Fig. 12 is a section taken in the plane indicated by line 12—12 in Fig. 10;

Figure 13:
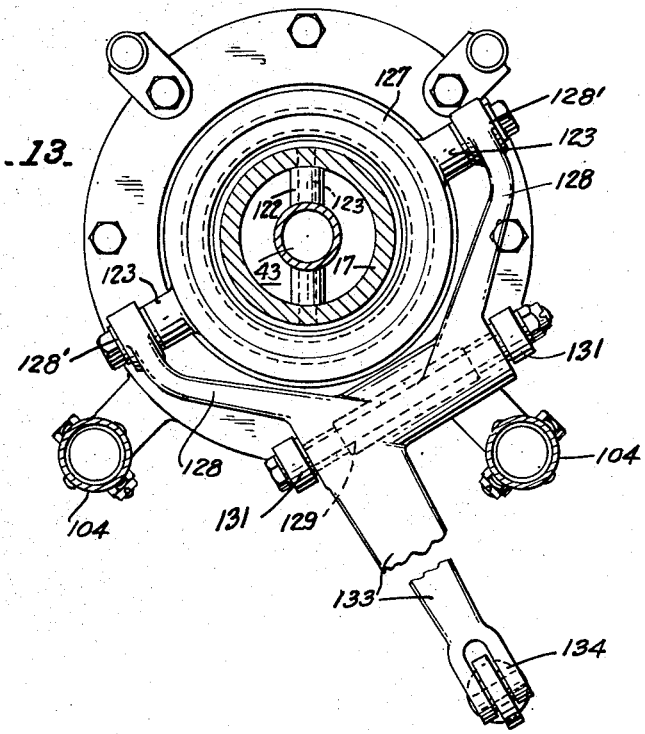
Fig. 13 is a horizontal sectional plan view of part of collective pitch control adjusting mechanism for the lift wings, taken in a plane indicated by line 13—13 in Fig. 4; portions of the structure being omitted from the view for purposes of clarity.

With reference to Figs. 1 and 2, the helicopter illustrated is of the general type disclosed in assignee's aforesaid copending application, and includes a body or frame 2 formed of the usual tubular struts having landing gear 3 attached thereto; and forming part of the body is a rearwardly extending tail 4. Located rearwardly of operator's seat or compartment 6 is an internal combustion engine 7 which is controlled from the operator's seat by a throttle control lever 8. Adjacent throttle control lever 8 is a lever 9 for collective pitch control of the lift wings more fully described hereinafter. The usual pair of foot pedal controls 11 is also provided in front of the operator's seat 6 for adjusting the pitch of the blades of a torque compensating tail rotor 12 which is driven through shafting 13 connected to the lift wing drive mechanism.

The helicopter is provided with a pair of diametrically opposite lift wings 14, and also with a pair of control blades or paddles 16, one for each wing; the lift wings and control blades being universally mounted, in a manner to be shortly described, at the top of a rotor column or shaft 17 which is driven from engine 7 through suitable gear mechanism in gear box 18 and a suitable engine clutch (not shown).

To facilitate an understanding of the operation of the mechanism, reference is made to Fig. 3 which depicts schematically the main elements of the control and the mounting for the two lift wings 14 which form the lift rotor, and the two control blades 16 which form the control rotor. As with respect to the lift wings and the control blades in the machine of the aforesaid copending application, each control blade 16 is provided with a low aspect ratio and a short radius so that the control rotor response speed is fixed at a relatively low value compared with the lift rotor in which each lift wing is of high aspect ratio and a considerably greater radius.

A universal mounting structure is provided for supporting each of the two diametrically opposite lift wings 14 for rotation about the axis of column 17, for pitch adjustment about a first axis extending longitudinally of the wings, and for flapping or end to end tilting about a second axis extending transversely to the first axis. For this purpose, the top end of rotor column 17 which is hollow, is provided with diametrically opposite trunnions 19 on which is pivotally mounted along the axis 21 of the trunnions a gimbal ring 22. A rigid double forked member or hub 23 is pivotally mounted at diametrically opposite points on gimbal ring 22 to pivot about an axis 24 extending transversely at a right angle to axis 21; the pivotal connection of hub 23 to gimbal ring 22 being by means of upstanding ears 26 rigid with the hub so as to cause the hub to be suspended from the gimbal ring. Hub 23 is formed with diametrically opposite radially extending bearing sleeves 27 in each of which is journalled a support shaft 28 for a wing 14.

From the preceding, it is seen that the described hub and gimbal ring mounting structure provides a universal supporting structure for the lift wings 14 to enable rotation thereof as a unit with column 17, or in other words, about the axis of such column; that pivotal axis 24 provides a first axis extending longitudinally of both of the diametrically opposite lift wings 14 for simultaneous pitch adjustment thereof; and that pivotal axis 21 provides a second axis substantially in the plane of axis 24 and extending at a right angle transversely with respect thereto for flapping or end to end tilting of the lift wings about such axis 21. In this connection, since both lift wings 14 form part of a unitary structure hub 23, the pitch adjustment about axis 24 will be simultaneous for the wings but in opposite directions so that when one wing is given a plus pitch adjustment through pilot controlled wobble mechanism to be described, the other lift wing is given an equal negative pitch adjustment, and vice versa. Also, both lift wings 14 will flap simultaneously about axis 21, although when one flaps downwardly the opposite wing will flap upwardly the same amount, and vice versa.

The described universal mounting structure for the lift wings 14 also provides a mounting for the control blades 16 which extend from diametrically opposite points of hub 23 along a third axis 29 transversely at a right angle with respect to the pitch adjustment axis 24 for lift wings 14. A pair of trunnions 31 extend from such opposite points and provide journal mountings for individual pitch adjustment of the control blades 16 about axis 29. Since control blades 16 are attached to hub 23, they are also rotatable about the axis of column 17 together with lift wings 14. Axis 29 and the axis 21 which is the previously mentioned flapping axis for the lift wings lie in substantially the same upright plane; and it will be noted that axis 29 is spaced below axis 21 with reference to the axis of column 17. In the embodiment of the invention illustrated in the aforesaid copending application, the pitch adjustment axis for the control rotor blades corresponding to the herein described axis 29 is substantially coincident with the flapping axis for the lift wings. It is the herein described spacing of axis 29 from axis 21 along the axis of the column which produces advantageous effects which will be described later on in connection with schematic Figs. 15 through 18.

Means is provided for effecting cyclic pitch control of the control blades 16 to effect through aerodynamic forces flapping of the control blades 16 about axis 24 which is the pitch adjustment axis for the lift wings 14, to thus automatically cause pitch adjustment of the lift wings about axis 24, and subsequently flapping of the lift wings about axis 21 through aerodynamic forces. Such means comprises universally mounted wobble mechanism 32 which is tiltable to a predetermined plane by means of pilot operable control stick 33, and a reversing linkage connection 34 between the wobble mechanism and the control blades 16.

The wobble mechanism 32 may be of any conventional construction but preferably comprises an inner ring 36 rotatable with column 17 and pivoted thereon about one axis, an intermediate ring 37 pivoted to inner ring 36 about an axis at a right angle to the first mentioned axis, and an outer ring 38 which is fixed against rotation and in which intermediate ring 37 is journalled; the control stick 33 being connected to the outer ring 38 so that the entire wobble mechanism may be tilted laterally in either direction, or forwardly or rearwardly by virtue of the universal mounting which the intersecting pivotal axes of the wobble mechanism provide.

Reversing linkage 34 between the wobble mechanism and control blades 16 comprises a pair of so-called scissors links. In each of such scissors links, a lower link member 39 is pivotally connected to inner ring 36 of the wobble mechanism and to an upper link member 41 which in turn is universally connected at its upper end to an arm 42 rigidly connected to a control blade 16 and extending radially downwardly therefrom with respect to the pitch adjustment axis 29 for the control blades. By the described arrangement, the entire linkage 34 can rotate about the axis of the rotor column together with hub 23, lift wings 14 and control blades 16.

Since each arm 42 connected to a control blade 16 is rigid therewith, turning of such arm about axis 29 results in pitch adjustment of the associated control blade 16; and inasmuch as arms 42 are connected to the upper link members 41, it is seen that the extent of pitch adjustment of control blades 16 can be controlled by the pilot through manipulation of the control stick 33 to fix the plane of inclination of the wobble mechanism. This results in imparting cyclic pitch control to control blades 16; and although each of the control blades 16 is individually adjustable as to pitch by means of the associated linkage 34, the cyclic pitch of both the control blades will be adjusted simultaneously but equally in opposite directions depending upon the portion of the diameter of the circle in which the rotation of the respective control blades occurs.

Cyclic pitch adjustment of the control blades 16 results in flapping or tilting thereof as a unit about axis 24 through aerodynamic forces. Since axis 24 is also the axis for pitch adjustment of the lift wings 14, the flapping or end to end tilting of the control blades 16 in turn results in cyclic pitch adjustment of the lift wings 14; and such cyclic pitch adjustment of the lift wings results in directional control of the ship through automatic flapping thereof about the axis 21.

As was previously mentioned, each of the shafts 28 for a lift wing 14 is journalled for rotation in a bearing sleeve 27 of hub 23. This is for the purpose of enabling so-called collective pitch control for altitude control, and has no functional relationship to the previously described cyclic pitch adjustment and flapping of both the control blades 16 and the lift wings 14. For effecting the so-called collective pitch control, axially movable shafting 43 extends axially within hollow column 17 and is pivotally connected at its upper end to a pair of push rods 44; the lower end of each rod 44 being universally connected by a ball joint to a link 46 extending through a slot in each sleeve 27 to effect turning of shaft 28, and consequently collective pitch adjustment of lift wings 14. The connections of links 46 to shaft 28 are at opposite sides thereof so that when shafting 43 is moved axially the shafts 28 will be simultaneously adjusted equally in opposite directions for equal pitch adjustment of lift wings 14.

Reference is now made to Figs. 4 through 14 which illustrate mechanical details of construction embodied in a preferred commercial embodiment of this invention for effecting the previously described effects. With respect to parts already identified, the same reference characters are applied to the corresponding parts in Figs. 4 through 14.

Figs. 4, 6 and 7 show the details best of the preferred mounting design for the lift wings 14 and the control blades 16. From these figures, it will be noted that each of the ears 26 for suspending hub 23 from gimbal ring 22 to provide the pivotal axis 24, comprises a pair of spaced flanges 51, and that each pair of flanges is secured to a pin 52 extending through the gimbal ring and journalled in suitable bearings 53 therein. Trunnions 19 upon which gimbal ring 22 is pivoted about the pivotal axis 21, are rigid with a sleeve 54 keyed to column 17 and clamped in an axial direction on the column by means of nut 56. Gimbal ring 22 is journalled on such trunnions 19 by means of suitable bearings 55 secured by lock nuts 55'.

As is illustrated in Figs. 4, 8 and 9, the pitch adjustment mounting of each lift wing 14 is by journalling each associated support shaft 28 in suitable bearings 57 in a bearing sleeve 27 projecting from hub 23. The inner end of each shaft 28 is hollow and the shaft is secured to the associated bearing sleeve 27 by means of a torsion rod 58 which comprises a conventional laminated steel plate construction as is shown in Figs. 8 and 9, permitting the shaft 28 to turn for the previously described collective pitch control, but at the same time securing shaft 28 and its associated lift wing 14 against endwise displacement under the tension forces to which these parts are subjected upon rotation of the lift wing about the axis of column 17.

From Fig. 9, it will be noted that torsion rod 58 is secured to shaft 28 by a pin 59 passing through a sleeve 61 inside of shaft 28; suitable spacers 62 being located about sleeve 61. One end of pin 59 is secured to shaft 28 by lock nut 63 while the other end of the pin is fixedly held by means of a pivotally connected reenforcing terminal link 64 a portion of which is shown in Fig. 9. The end of terminal link 64 opposite to that shown in Fig. 9 is secured by a pivotal connection to the associated lift wing in a manner similar to that shown in the aforesaid copending application. Torsion rod 58 is secured to hub 23 in a manner similar to that shown in Fig. 9 by means of a pin 66 (Fig. 4) passing through sleeve 67; the pin 66 being secured by lock nuts 68 at the ends thereof. For enabling turning of each shaft 28 for collective pitch adjustment of the associated lift wing 14, it will be noted from Figs. 4 and 8 that bearing sleeve 27 is provided with diametrically opposite slots 71 through each of which passes a pin 72 secured to sleeve 28 and extending through an enlarged aperture 73 in torsion rod 58. Pin 72 forms part of the previously mentioned link 46 universally connected to a push rod 44 of the collective pitch control adjusting mechanism.

Referring to Figs. 4 and 7 each control blade is journalled on an associated trunnion 31 by a sleeve 74 secured to the inner end of the shaft 75 to which a control blade 16 is secured. Each sleeve 74 is journalled on suitable spaced bearings 76 between the sleeve 74 and trunnion 31; the inner bearing 76 being secured in position by means including lock nut 77. Thus, each sleeve 74 can be independently rotated on associated trunnion 31 for pitch adjustment of the associated control blade 16 through the previously described wobble mechanism adjustment and the linkage connection between the wobble mechanism and the control blade. In this connection, it will be noted that the previously mentioned arm 42 connected to each control blade 16 comprises spaced plates 81 which are rigidly attached to a downwardly extending ear 82 at the inner end of each sleeve 74.

As can be seen best from Figs. 4, 10 and 11, the lower ends of plates 81 are fixedly secured to a ball member 83 mounted in suitable bearings 84 in a cross pin 86 the ends of which are journalled in the forked parts 87 forming the upper end of each upper link member 41. Thus, a universal connection obtains between each arm 42 and the upper end of each link 41. The lower end of each link 41 is pivotally connected to the upper end of each associated link 39 by a pin 88 (Fig. 12) passing through a sleeve portion 89 provided at the lower end of link 41; the ends of pin 88 being journalled in suitable bearings 91 mounted in the forked portions 92 at the upper end of lower link member 39.

Figure 14:
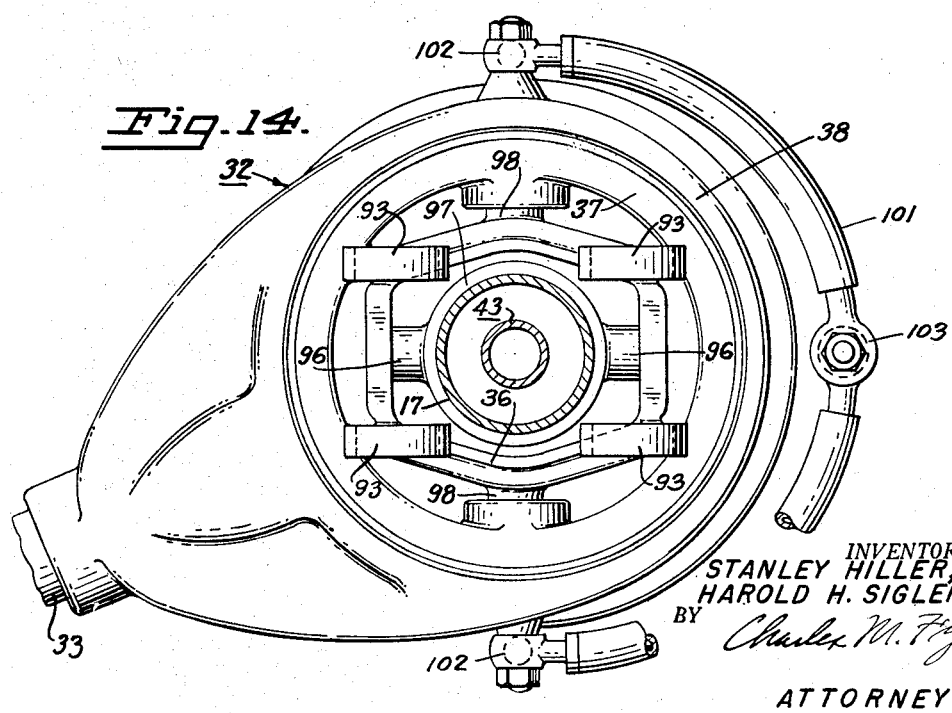
Fig. 14 is a similar view of the wobble mechanism taken in a plane indicated by line 14—14 in Fig. 4.

With particular reference to Figs. 4, 10 and 14, the lower end of each link 39 is pivotally connected to a pair of upstanding lugs 93 by means of pivot pin 94; the lugs 93 being fixedly secured to the previously mentioned inner ring 36 of wobble mechanism 32. Inner ring 36 of the wobble mechanism is pivotally mounted on diametrically opposite extending trunnions 96 mounted on a sleeve 97 rigidly secured to rotor column 17 for rotation therewith. Previously mentioned intermediate ring 37 of the wobble mechanism is pivoted on similar diametrically opposite trunnions 98 fixed to inner ring 36 and which are on a diameter at a right angle to that upon which trunnions 96 are positioned. Consequently, by the described arrangement, the wobble mechanism has the previously mentioned universal mounting so that it can be inclined to any desired control plane, while at the same time permitting rotation of both the wobble mechanism rings 36 and 37 with the column 17.

For adjusting the plane of rotation of the wobble mechanism, inner ring 36 and intermediate ring 37 thereof rotate relative to the non-rotatable outer ring 38; suitable bearings 99 being positioned between intermediate ring 37 and outer ring 38. Previously mentioned control stick 33 is connected to the outer ring, so that tilting thereof results in tilting of the entire wobble mechanism which through the scissors linkage connections 34 between the wobble mechanism and the control blades 16 produces the previously described cyclic pitch adjustments of the control blades. Outer ring 38 of the wobble mechanism is held against rotation by means of yoke member 101 universally connected at diametrically opposite points by suitable ball joint connections 102 to the outer ring 38; the yoke being in turn universally connected by ball joint connection 103 to V-shaped support standard 104 (Figs. 4 and 5) rigidly attached to gear box 18.

The collective pitch adjustment mechanism for the lift wings 14 includes the previously mentioned axially shiftable collective pitch shafting 43 within rotor column 17 and which is pivotally connected at its upper end to the pair of push rods 44 in turn universally connected to the link members 46 connected to the lift wings. With reference to Figs. 4 and 7, it will be noted that shafting 43 includes a screw threaded portion 106 which is adjustably mounted and can be locked in position by lock nut 107. The upper end of portion 106 is universally connected at 108 to an upper end portion 109 of the shafting which is slidable within a guide sleeve 111 integral with a cross plate 112 secured by cap screws 113 to the inner flanges 51 of ears 26 on hub 23.

Packing rings 114 are provided in sleeve 111; and the upper end of shaft portion 109 carries saddle member 116 to which the previously mentioned push rods 44 are pivotally connected; the lower ends of push rods 44 being universally connected by ball joints 117 to the links 46 (Fig. 8) connected to the lift wing shafts 28. Thus, it is apparent that as the collective pitch shafting 43 is moved axially within tubular column 17, the pitch of the lift wings can be varied equally for altitude control, independent of the cyclic pitch adjustment effected by the wobble mechanism.

For actuating the collective pitch shafting 43, its lower end (Figs. 4 and 13) is pivotally connected at 121 to a sleeve 122 through which extends a pin 123. Pin 123 extends through diametrically opposite slots 124 in column 17, and its ends are mounted in a rotatable inner bearing ring race 126 which is slidably secured to column 17. The outer race 127 of such bearing ring is non-rotatable, being held so by yoke 128 having pivotal connections 128' therewith at diametrically opposite points. Yoke 128 is in turn pivotally connected by pivot pin 129 to an upstanding fulcrum member 131 in turn pivotally connected at 132 to gear box 18.

An extension lever 133 rigid with yoke 128 has a ball joint pivotal connection at 134 with actuating link 136. Movement of link 136 up or down causes yoke 128 to pivot about pivotal connection 129 to effect up or down movement of shafting 43 for the previously mentioned collective pitch control of the lift wings. In this connection, shafting 43 can rotate with column 17 by virtue of the fact that it is connected to inner bearing race 126 which rotates relative to outer race 127 which is held fixed by yoke 128. Link member 136 is connected to the collective pitch control operating lever 9 (Fig. 2) at the operator's station.

*Operation.*—Schematic Figs. 3 and 15 through 18 may be best referred to for an explanation of the feed back effect produced by spacing the pitch adjustment axis 29 of the control blades 16 a distance D along the axis of column 17 from the flapping or tilting axis 21 of the lift wings 14. In Figs. 15 through 18, only the main parts are depicted, to which the reference characters of Fig. 3 are applied. Although in the preferred construction, both the lift wings 14 of the lift rotor and the control blades 16 of the control rotor rotate in substantially the same plane about the axis of column 17, they are shown in Figs. 15 through 18 as being in different planes to facilitate illustration, as this makes no difference insofar as feed back is concerned. In some of these views, the actual lift wings and control blades are not shown but their shafting 28 and 75, respectively, are illustrated.

It will be recalled that arm 42 which extends radially from pitch adjustment axis 29 for the control blade is rigidly connected thereto so that it will turn therewith. Consequently, when the wobble mechanism is adjusted from one plane to another predetermined plane to cause the lift wings to flap ultimately from any previous position about flapping axis 21, and inasmuch as axes 21 and 29 are spaced apart relative to each other and arm 42 is universally anchored to the link 41, arm 42 must turn about link 41 as a fulcrum and change the pitch of the control blade in a direction opposite the flapping. The rate of change resulting from flapping of the lift wing will depend on the ratio $D/L$ in which D is the distance between axes 21 and 29, and L is the distance between axis 29 and the center point of universal connection between arm 42 and link 41.

This ratio is the feed back ratio which is defined as the fraction of the lifting rotor flapping used for opposite control blade cyclic pitch adjustment. The ratio may vary considerably, a suitable operating range being from 0 to 2. In Figs. 15 through 18, this ratio is 1 for purposes of illustration. In other words, distance D is equal to distance L.

Figure 15:
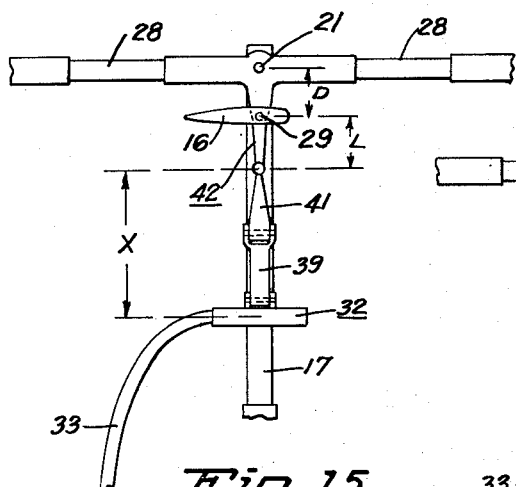
Figs. 15, 16, 17 and 18 are schematic views illustrating various phases of the operation of the feed-back mechanism embodied in this invention.

Another leverage effect is provided by the spacing of the scissors links 41 and 39 in the neutral position of Fig. 15, between the center point of the universal connection of wobble mechanism 32 and the center point of universal connection between upper link 41 and arm 42, represented by X. Distance X is desirably greater than distance L, so that the ratio of the distance $X/L$ provides a mechanical advantage in that for any given angle of tilt to which the wobble mechanism may be adjusted from a given position by control stick 33, the angle of pitch adjustment of the control blade will be multiplied according to such ratio which is defined as the input ratio. In Figs. 15 through 18 this input ratio is shown as about 2½ to 1, which is desirable with a maximum wobble tilt of about 8° to 10°.

As previously explained, the adjustment to the control blade imparted through the wobble mechanism by the pilot operated control stick has an inherently slower rate of response compared to direct adjustment of the lift wing, which is extremely desirable under substantially fixed control stick flight conditions. In leaving the ground or when it is intended to change direction of the ship in the air, it is desirable that this rate of response be adequately high for flapping or tilting of the lift wing for directional control. Hence, an input ratio of greater than 1 is employed to increase such rate of response under these conditions. Now without the feed back leverage, when the wobble mechanism is tilted from any given plane, the lift wing would flap or cock initially the same number of degrees as the cyclic pitch adjustment of the control blade, but it is undesirable, for example, in leaving the ground that the lift wing flap or tilt more than plus or minus (±) 8° to 12.5° depending on the design of the ship, because if it tilted too much this might result in the wing striking its mechanical stops or parts of the ship structure, such as the tail boom. For purposes of illustration, a 12.5° maximum lift wing tilt is shown in Figs. 15 through 18.

At the same time, for providing an adequately high rate of response for directional control, it is desirable that the maximum control blade cyclic pitch amplitude at full control stick throw be plus or minus 20° to 25° which is effected by the described input ratio of about 2½ to 1, so that, for example, at a 10° maximum tilt of the wobble mechanism, the initial cyclic pitch adjustment of the control blade will be 25°. With the feed back leverage, the lift wing will not flap 25°, even though the control blade's initial cyclic pitch adjustment amplitude will be plus or minus 25°, because such leverage immediately operates as the lift wing commences to flap to cancel out the excess 12.5°, as is graphically illustrated in the successive Figs. 15 through 18. Hence, there will be no danger of the lift wing tilting to an extent where it might strike parts of the ship.

Fig. 15 represents a condition at which both the lift wing and the control blade have zero degree flap or tilt and a zero degree pitch, which may be a condition existing with the ship on the ground just before take-off, and the rotor column is perpendicular to the horizontal. Now assume that the pilot desires to move forward, he pushes the control stick forward, and for quick get away may do so to the maximum degree of tilt of the wobble mechanism, which for the purposes of explanation is assumed as 10°. In this connection, it will be noted that the scissors linkage 39—41 provides a reversing linkage to cause the pitch adjustment of the control blades and the ultimate plane of rotation of the lift wings for directional control to correspond with the direction in which the control stick is moved. As a result, for example, when the control stick is moved straight forward, the cyclic pitch adjustment will be such that the ship will move forward. For rearward motion, the pilot need only move the control stick rearwardly, etc. Without such reversing linkage, the pilot would have to move the control stick opposite to the direction in which he desired to travel.

Figure 16:
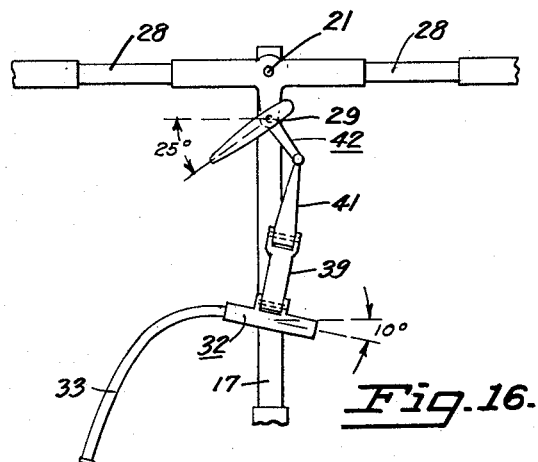

Fig. 16 illustrates the momentary condition which occurs when the wobble mechanism is adjusted to its maximum 10° tilt for forward motion. Through the above described preferred input ratio of about 2½ to 1, it will be noted that the control blade's pitch will be adjusted to 25°, thus providing the relatively quick initial rate of response. In this connection, it should be kept in mind that in Fig. 16 only the initial mechanical movement is depicted between the wobble mechanism and the control blade; and it is assumed that the lift wing and the control blade have not rotated about the axis of the rotor column from the position shown in Fig. 15. However, from the position shown in Fig. 16, it will be observed that as soon as the lift wing commences to tilt or flap about axis 21 through aerodynamic reaction, the feed back leverage acts to cause control arm 42 to pivot about lever 41 as a fulcrum, which results in the pitch of control blade being reduced.

In this connection, it should be kept in mind that as both the lift wing and the control blade rotate about the axis of rotor column 17, from the position shown in Fig. 16, the pitch adjustment of the control blade results through aerodynamic action in partial flapping thereof about axis 24 (Fig. 3). Because of gyroscopic effects, the partial flapping of the control blade will occur at a point 90° from the point at which the pitch adjustment is effected. At this time the lift wing's pitch will be partially adjusted because the lift wing pitch adjustment axis 24 is the same as the control blade flapping axis; and 90° later partial flapping of the lift wing occurs about its flapping axis 21. These effects are accumulated at 90° intervals through a plurality of revolutions of the lift wing and the control blade about the axis of the rotor column, until equilibrium is reached as determined by the plane of adjustment of the wobble mechanism.

Figure 17:
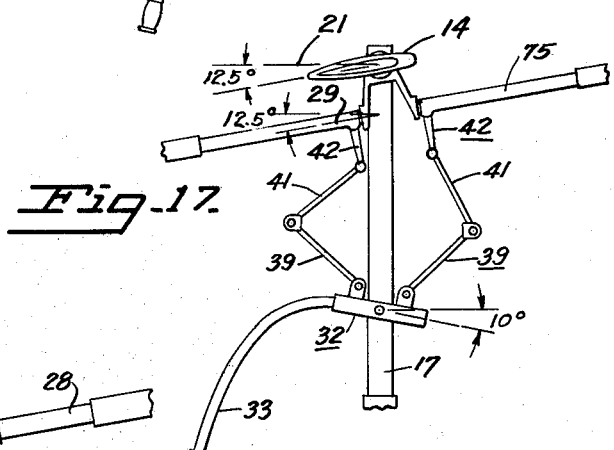
Figure 18:
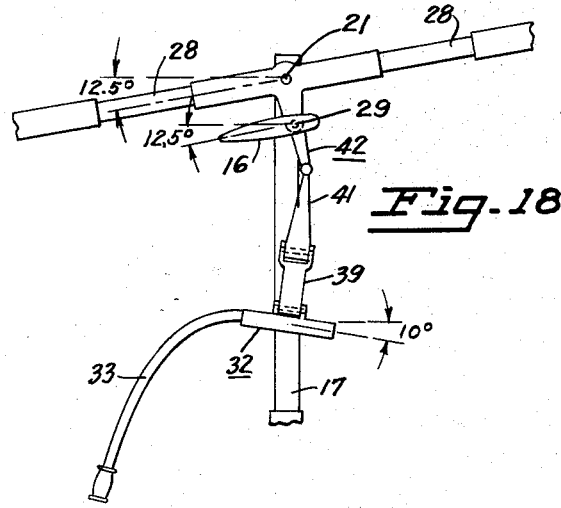

Such state of equilibrium is illustrated in Figs. 17 and 18 in which Fig. 17 differs from Fig. 18 merely in illustrating the parts rotated 90° from the position shown in Fig. 18. Both the lift wing and the control blade have flapped or tilted to a new plane of rotation determined by the inclination of the wobble mechanism. At such position, it will be noted by comparing Figs. 16 and 18, that the pitch of the control blade and consequently its angle of tilt has now been reduced to 12.5° and that the lift wing has flapped to a new plane of rotation at the same angle of 12.5°. This is so because the feed back ratio of 1, causes the pitch of the control blade to be reduced to the angle of tilt of the lift wing.

Thus, it is seen that the feed back effect overcomes the problem which might occur in the lift wing striking parts of the ship by virtue of the employment of a relatively high input ratio for greater directional control response of the ship. The feed back leverage is also of advantage in compelling the lift wing rotor to follow inclination of the rotor column. This is so because should the body of the ship and consequently the rotor column tend to oscillate with reference to the plane of rotation of the lift wing which might be caused by a gust of wind or otherwise, arm 42 will be turned to change the pitch of the control blade, and consequently ultimately cause the lift wing to tilt to the same plane of rotation with respect to the rotor column. Hence, the pilot can be always sure of the position of the body of the ship in relation to the plane of rotation of the lift wing rotor.

The above explanation is merely given for purposes of illustration; it being understood that

We claim:

1. In a rotary wing aircraft, a lift wing supporting column, a lift wing, a structure for mounting said lift wing on said column for rotation about the axis of the column and for pitch adjustment about a first axis extending longitudinally of the lift wing and for flapping of the lift wing about a second axis extending transversely with respect to said first axis, a control blade mounted on said lift wing mounting structure for pitch adjustment about a third axis extending longitudinally of said control blade and transversely with respect to said first axis, said third axis being spaced from said second axis along the axis of said column; and means for effecting pitch adjustment of said control blade including wobble mechanism, a pilot operable control member connected to said wobble mechanism, and a linkage connection between said wobble mechanism and said control blade.

2. In a rotary wing aircraft, an upright lift wing supporting column, a lift wing, a structure for mounting said lift wing on said column for rotation about the axis of the column and for pitch adjustment about a first axis extending longitudinally of the lift wing and for flapping of the lift wing about a second axis extending at a right angle with respect to said first axis, said first and second axes lying in substantially the same plane, a control blade journalled on said lift wing mounting structure for pitch adjustment about a third axis extending longitudinally of the control blade and transversely with respect to said first axis, said third axis being spaced below said second axis; and means for effecting pitch adjustment of said control blade including wobble mechanism, a pilot operable control member connected to said wobble mechanism, and a linkage connection between said wobble mechanism and said control blade.

3. In a rotary wing aircraft, an upright lift wing supporting column, a lift wing, a structure for mounting said lift wing on said column for rotation about the axis of the column and for pitch adjustment about a first axis extending longitudinally of the lift wing and for flapping of the lift wing about a second axis extending at a right angle with respect to said first axis, said first and second axes lying in substantially the same plane, a control blade journalled on said lift wing mounting structure for pitch adjustment about a third axis extending longitudinally of the control blade and transversely with respect to said first axis, said third axis being spaced below said second axis with said third and second axes lying in substantially the same upright plane; and means for effecting pitch adjustment of said control blade including wobble mechanism, a pilot operable control member connected to said wobble mechanism, an arm connected to said control blade and extending radially with respect to said third axis, and a plurality of pivotally connected members pivotally connected to said arm and to said wobble mechanism.

4. In a rotary wing aircraft, a lift wing supporting column, a lift wing, a forked member upon which the lift wing is supported, means mounting the forked member on said column for rotation about the axis of the column and for pitch adjustment of the lift wing about a first axis extending longitudinally of the lift wing and for flapping of the lift wing about a second axis extending transversely with respect to said first axis, a control blade journalled on said forked member for pitch adjustment about a third axis extending longitudinally of said control blade and transversely with respect to said first axis, said forked member having a part projecting in a substantially upright plane therefrom to provide for pivotal connection thereof on said mounting means for said pitch adjustment of the lift wing about said first axis whereby said third axis is spaced from said second axis along the axis of said column, and means including an element connected to said control blade and a pilot operable control member for effecting pitch adjustment of said control blade.

5. In a rotary wing aircraft, a lift wing supporting column, a lift wing, a control blade for said lift wing, supporting means mounting said lift wing and said control blade for simultaneous rotation about the axis of said column; said supporting means including a pivotal mounting along a first axis extending longitudinally of the lift wing for pitch adjustment thereof, a pivotal mounting along a second axis extending transversely of said first axis for flapping of the lift wing, and a journal mounting for the control blade for pitch adjustment thereof about a third axis extending transversely with respect to said first axis whereby pitch adjustment of said control blade results through aerodynamic forces in flapping thereof about said first axis which automatically results in pitch adjustment of said lift wing about said first axis and flapping of said lift wing about said second axis; a tiltable wobble mechanism; and a linkage connection between said wobble mechanism and said control blade whereby tilting of said wobble mechanism results in pitch adjustment of said control blade said second and said third axes being spaced apart axially along said column to provide a feed back leverage to change the pitch of the control blade by flapping of the lift wing.

6. The construction of claim 5 in which the linkage connection between the wobble mechanism and said control blade includes mechanism for providing a greater angle of pitch adjustment of said control blade for any given angle to which the wobble mechanism is initially tilted.

STANLEY HILLER, Jr.
HAROLD H. SIGLER.

REFERENCES CITED

The following references are of record in the file of this patent:

UNITED STATES PATENTS

| Number | Name | Date |
| --- | --- | --- |
| 2,457,429 | Young | Dec. 28, 1948 |
| 2,481,750 | Hiller, Jr., et al. | Sept. 13, 1949 |